June 17, 1969

R. C. BUELER 3,450,154

CONTROL VALVE

Filed March 10, 1967

INVENTOR
RICHARD C. BUELER
BY
Joseph E. Papin

INVENTOR
RICHARD C. BUELER
BY
Joseph E. Papin

United States Patent Office 3,450,154
Patented June 17, 1969

3,450,154
CONTROL VALVE
Richard C. Bueler, Glendale, Mo., assignor to Wagner Electric Corporation, South Bend, Ind., a corporation of Delaware
Filed Mar. 10, 1967, Ser. No. 622,200
Int. Cl. B60t *11/24;* F16k *31/165*
U.S. Cl. 137—492.5      2 Claims

ABSTRACT OF THE DISCLOSURE

An application valve for use in controlling the actuation of braking mechanisms in a fluid pressure system is provided with a push rod for the standard mechanical actuation to provide pressure fluid flow to and exhaustion from the braking mechanisms. The application valve is also provided with an emergency valve which is responsive to a loss of fluid pressure in the system to establish pressure fluid flow from an emergency reservoir to an expansible fluid pressure chamber and the introduction of the pressure fluid into the expansible chamber serves to actuate the application valve in the same manner as the push rod does mechanically.

Background of the invention

This invention relates to fluid pressure systems for vehicles and in particular to control valves therefor normally actuated in response to an applied force and having emergency means therein to effect the actuation thereof in response to a defect in said fluid pressure system.

In the past, application or control valves have been provided with mechanical means for actuation but have lacked emergency means therein which automatically operated independently of said mechanical means to actuate said control valve upon a loss of fluid pressure in the system.

The object of the present invention is to provide a novel control valve having emergency means therein for automatic actuation thereof in response to a drop of fluid pressure in said system below a predetermined value.

Another object of the present invention is to provide a novel control valve for use in a fluid pressure system having mechanical means therein for actuating said control valve and a fluid pressure chamber expansible upon a loss of fluid pressure in the system for emergency actuation of said control valve.

Another object of the present invention is to provide a novel control valve for use in a fluid pressure system which is normally operated by mechanical means and which, in response to a loss of fluid pressure in the system, is operated by fluid pressure supplied thereto by an auxiliary or emergency reservoir.

These and other objects and advantages of the present invention will become apparent hereinafter.

Summary

Briefly, the present invention comprises a control valve for use in a fluid pressure system having application means movable therein and defining a fluid pressure chamber, force applying means for said application means, said application means being movable in response to the operation of said force applying means toward its actuated position, and other means in said housing controlling the supply of fluid pressure to said chamber, said other means being movable in response to fluid pressure in said system below a predetermined value to supply fluid pressure to said chamber to move said application means toward its actuated position.

Brief description of the drawings

In the accompanying drawings which form a part of this specification and wherein like numerals refer to like parts wherever they occur.

Description of the preferred embodiments

Figure 1:
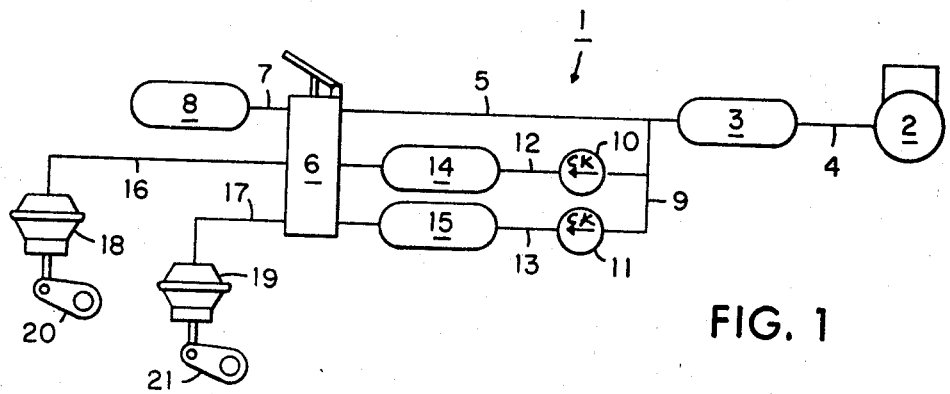
FIG. 1 is a diagrammatic view of a fluid pressure system having a control valve therein embodying the present invention.

Referring now to FIG. 1, a fluid pressure system 1 is shown having fluid pressure generating means, such as a compressor 2, connected with a system or main reservoir 3 by a conduit 4. A delivery conduit 5 is connected between the main reservoir 3 and the control port of an application or control valve 6, and another conduit 7 is connected between the emergency port of said control valve and an emergency reservoir 8. Another conduit 9 is connected between the delivery conduit 5 and check valves 10, 11 which are, in turn, connected in branch conduits 12, 13, respectively, to provide unidirectional pressure fluid flow from the main reservoir 3 to auxiliary or branch reservoirs 14, 15. The branch conduits 12, 13 are respectively connected with a pair of inlet ports provided in the application or control valve 6, and conduits 16, 17 are respectively connected between brake chambers or motors 18, 19 and a pair of outlet ports also provided in said control valve, said brake chambers being operatively connected with slack adjustors 20, 21 to control the energization of friction devices or wheel brake assemblies on separate vehicle axles (not shown).

Figure 2:
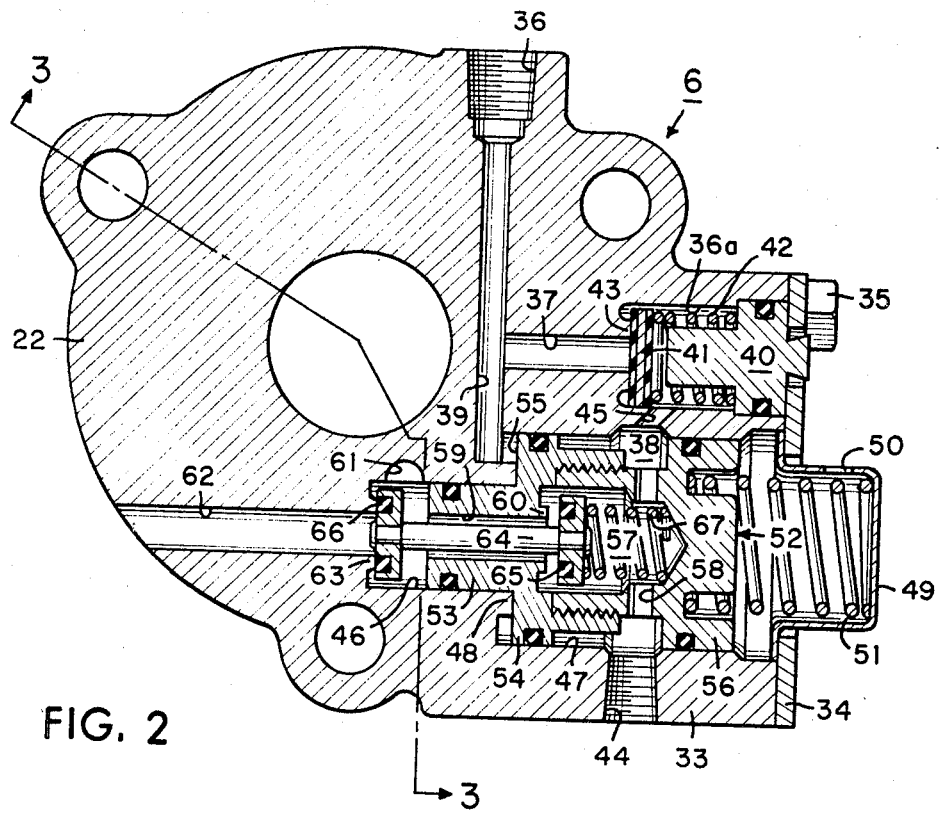
FIG. 2 is a sectional view showing the control valve of FIG. 1 in cross-section.
Figure 3:
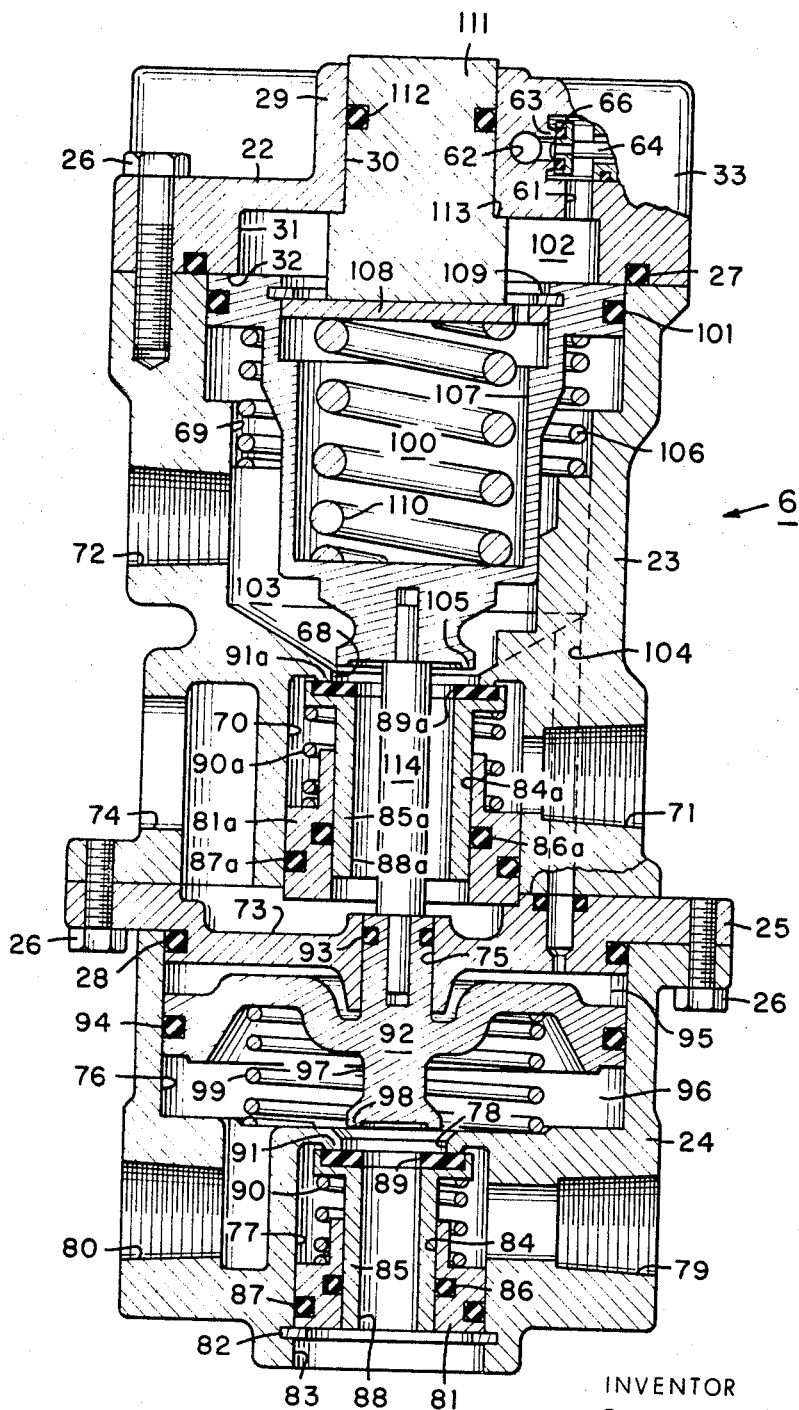
FIG. 3 is a sectional view taken substantially along the line 3—3 of FIG. 2.

Referring now to FIGS. 2 and 3, the control valve 6 is provided with a closure member 22, upper and lower housing 23 and 24, and a connecting plate 25 which are interconnected by suitable means, such as a plurality of studs 26, and seals 27, 28 are sealably disposed between the closure member and upper housings 22, 23 and between the lower housing and connecting plate 24, 25, respectively.

The closure member 22 is provided with a central boss 29 having a bore and counterbore 30, 31 therein, and the lower end of said closure member provides a radially extending abutment or shoulder 32 thereon. The closure member 22 is also provided with an emergency valve casing portion 33 having a plate member 34 secured thereto by suitable means, such as studs 35.

An inlet or control port 36 which receives the conduit 5, as previously mentioned, is formed in the housing portion 33 and connects with an inlet chamber 36a through passage 37 and a control chamber, shown generally at 38, through passage 39. The inlet chamber 36a is sealed by an insert plug 40, and a check valve 41 is biased by a spring 42 to a normally closed position against a valve seat 43 formed at the inlet passage 37. An emergency port 44 which receives the conduit 7, as previously mentioned, is provided in the housing portion 33 in open fluid communication with the control chamber 38, and the inlet chamber 36a is connected to the control chamber 38 intermediate its ends by a passage 45.

The control chamber 38 includes a bore 46 and counterbore 47 having a shoulder 48 therebetween connected by the passage 39 with the inlet port 36. The counterbore 47 is closed at its outer end by flanged cup 49 having an atmospheric passage 50 therein, said flanged cup seating one end of a spring 51. A stepped emergency control piston 52 includes a small end 53 slidable in the bore 46 and a large end 54 slidable in the counterbore 47, the piston having a fluid responsive shoulder area 55 normally biased against the chamber shoulder 48 by the spring 51. It will be observed that the large end 54 of the piston 52 also includes a piston extension member 56 threaded thereto and forming an internal chamber 57, the extension member 56 or large piston portion having radial ports 58 to provide fluid communication between the internal chamber 57, control chamber 38 and passage 45 to the inlet chamber 36a at all times. An axial passage 59 is also formed in the piston 52 from the small end 53 to the internal chamber 57, and a valve seat 60 is formed on the piston 52 around the passage 59 projecting into the chamber 57.

The bore 46 at the small end 53 of the control piston 52 is connected by a passage 61 with the counterbore 31 of the closure member 22, and an exhaust passage 62 is also connected to the bore 46 and has a valve seat 63 formed at the end of the bore 46 around the exhaust passage 62.

Fluid communication between the internal chamber 57, the passage 61, and the exhaust passage 62 is controlled by a dumbbell type valve assembly having a shank 64 slidable in the axial passage 59, but permitting fluid flow therethrough. An emergency inlet control valve 65 is positioned on the end of the shank 64 in the internal chamber 57, and an exhaust control valve 66 is formed on the other end of the shank 64 in the bore 46. A spring 67 in the internal chamber 57 biases the inlet and exhaust control valves 65 and 66 toward the respective valve seats 60 and 63 therefor.

The upper housing 23 is provided with a connecting bore 68 axially interposed between a stepped upper counterbore 69 and a lower counterbore 70, and a set of inlet and outlet ports 71, 72 which receive conduits 12, 16, as previously mentioned, are provided in said upper housing connecting with said lower and upper counterbores, respectively. The connecting plate 25 is recessed at 73, and said recess connects between the lower counterbore 70 and an exhaust port 74 which is provided in the upper housing 23. The connecting plate 25 is also provided with a centrally located aperture 75 therethrough which connects with an upper counterbore 76 provided in the lower housing 24, and said upper counterbore 76 is connected with a lower counterbore 77 by a connecting bore 78 therebetween in said lower housing. Another set of inlet and outlet ports 79, 80 which receive conduits 13, 17, as previously mentioned, are provided in the lower housing 24 respectively connecting with the counterbores 77, 76.

A pair of valve guide members 81, 81a are respectively positioned in the lower and upper housing counterbores 77, 70, said valve guide member 81a normally being seated in displacement preventing engagement with the connecting plate 25 and said valve guide member 81 being seated in displacement preventing engagement with a snap ring and groove assembly 82 provided adjacent the lower end of the counterbore 77. The lower end of the counterbore 77 also defines an exhaust port 83. The valve guide members 81, 81a are provided with axial valve bores 84, 84a in which valve elements 85, 85a are slidably received, and seals 86, 86a and 87, 87a are carried in said valve guide members in sealing engagement with said valve elements and the lower and upper housing counterbores 77, 70, respectively. The valve elements 85, 85a are provided with axial exhaust openings or passages 88, 88a therethrough normally providing pressure fluid communication between the lower housing outlet and exhaust ports 80, 83 and between the upper housing outlet and exhaust ports 72, 74, respectively, and annular resilient seals or discs 89, 89a are provided on the upper ends of said valve elements in circumscribing relation with said exhaust openings. Valve springs 90, 90a are biased between said valve guide members 81, 81a and the valve elements 85, 85a normally urging the valve element seals 89, 89a into sealing engagement with valve seats 91, 91a provided on the lower and upper housings 24, 23 in circumscribing relation with the connecting bores 78, 68 thereof, and in this manner, said valve elements normally interrupt pressure fluid communication between the lower housing inlet and outlet ports, 79, 80 and between the upper housing inlet and outlet ports 71, 72, respectively.

A stepped application member or relay piston, indicated generally at 92, is slidable in the lower housing counterbore 76 and the connecting plate bore 75 and carries peripheral seals 93, 94, in sealing engagement with said connecting plate bore and lower housing counterbore, respectively. An expansible application chamber 95 is defined in the lower housing counterbore 76 between the upper end of the relay piston 92 and the connecting plate 25, and the lower end of said relay piston defines with said lower housing counterbore an outlet chamber 96 in pressure fluid communication with the outlet port 80. An extension 97 is provided on the lower end of the relay piston 92 having a valve seat 98 on the free end thereof for operative engagement with the valve element 85, and a return spring 99 is biased between said relay piston and the lower housing 24 normally urging said relay piston toward engagement with the connecting plate 25 and spacing said relay piston valve seat 98 from said valve element 85.

Another stepped application member or reaction piston, indicated generally at 100, is slidable in the upper housing counterbore 69 and carries a peripheral seal 101 in sealing engagement with said upper housing counterbore. An expansible control chamber 102 is defined in the upper housing counterbore 69 between the upper end of the reaction piston 100 and the closure member 22 in pressure fluid communication with the passage 61. Another outlet chamber 103 is defined in the upper housing counterbore 69 adjacent the other side of said reaction piston in pressure fluid communication with the outlet port 72, and passages 104 are provided in the upper housing 23 and the connecting plate 25 in open pressure fluid communication between the upper housing outlet chamber 103 and the lower housing application chamber 95. The lower or free end of the reaction piston 100 defines a valve seat 105 for operative engagement with the valve element 85a, and a return spring 106 interposed between the upper housing 23 and said reaction piston normally urges said reaction piston toward abutting engagement with the radially extending wall 32 of the closure member 22 and predeterminately spaces the reaction piston valve seat 105 from said valve element 85a. A stepped metering spring bore 107 is axially provided in the reaction piston 100, and a spring retainer or guide 108 is slidable in the bore 107 and is retained therein against displacement by a snap ring and groove assembly 109 provided adjacent to the upper end of the bore 107. The spring retainer 108 is normally urged into abutment with the snap ring 109 by the compressive force of a metering spring 110 which is precompressed between the retainer 108 and the lower end wall of the metering spring bore 107.

A push rod member 111 is slidably received in the bore 30 of the closure member 22, and a seal 112 is carried in said push rod member in sealing engagement with said bore, said sealing engagement of said seal 112 with the bore 3 defining an effective area on said push rod member for subjection to fluid pressure in the chamber 102. A displacement preventing flange 113 is provided on the lower end of said push rod member 111 normally in abutting engagement between the annular shoulder formed at the juncture of the bore and counterbore 30, 31 and the metering spring retainer 108 in the reaction piston 100. The upper end of the push rod 111 is slidable in the closure member bore 30 in response to an operator applied force thereon.

To complete the description of the control valve 6, an abutment member or force transmitting linkage 114 is provided between the lower or free end of the reaction piston 100 and the upper end of the relay piston 92, said member 114 extending axially through the exhaust opening 88a of the valve element 85a and the recess 73 of the connecting plate 25.

In the charging operation of the fluid pressure system 1, assuming that the reservoirs 3 and 8 are empty, FIGS. 2 and 3 show the parts of the control valve 6 in the normally inoperative condition thereof. When the air compressor 2 is placed in operation, pressure fluid will be discharged to the main reservoir 3 and will flow therefrom through the conduit 5 to the control port 36 of the control valve 6 and through the conduits 9, 11 and 12 to the branch reservoirs 14 and 15.

The pressure fluid will flow from the control port 36 through the passage 39 and will act on the effective area of the control piston shoulder 55. The pressure fluid will also flow through the passage 37 to open the check valve 41 and flow therefrom into the inlet chamber 36a, passage 45, control chamber 38 and emergency port 44 through the conduit 7 to the emergency reservoir 8. From the control chamber 38 and passage 58, the pressure fluid flows into the internal chamber 57 of the control piston 52 and acts on the equal and opposite areas of the large end 54 of the piston 52, and from the internal chamber 57 the pressure fluid flows past the open emergency inlet control valve 65 through the passage 61 into the expansible chamber 102 and acts upon the effective area of the application piston 100.

The air pressure built up in the expansible chamber 102 acts on the effective area of the push rod member 111 urging the flange 113 thereof into displacement preventing engagement with the housing 22 in opposition to any manual operating force applied on said push rod member, and such air pressure in said chamber will move the application piston 100 downwardly independently of the push rod member 111 toward its actuated position causing the valve seat 105 of the stem to seal on the valve 89a of the valve assembly 85a to close off the exhaust passage 74. The valve member 85a is then moved downwardly by the application piston 100 to unseat the valve 89a from the seat 91a and provide communication from the reservoir 14 through opening 68 to the outlet port 72 and conduit 16 to actuate the air chamber 18 which rotates the slack adjustor 20 to energize the friction device associated therewith, and this pressure fluid passes through the passage 104 into the chamber 95 to urge the application piston 92 downwardly to unseat the valve member 89 from the valve seat 91 and establishes pressure fluid flow from the reservoir 15 through opening 78 to the outlet port 80 and conduit 17 to actuate the brake chamber 19 which rotates the slack adjustor 21 to energize the friction device associated therewith.

It will be apparent that the air compressor 2 will continue to operate until a predetermined fluid pressure is provided in the main reservoir 3, and a substantially equal fluid pressure will also be developed in the auxiliary reservoir 8 due to the fact that the check valve 41 is loaded by a spring 42 of negligible force. When the pressure in the port 36 and passage 39 reaches a preselected value, the force of the pressure acting on the area 55 of the control piston 52 moves the piston against the compressive force of the spring 51 whereby the emergency inlet control valve 65 is seated on the valve seat 60 to seal off the axial passage 59. The continued pressure built up on the area 55 of the control piston 52 moves and maintains said piston in a rightward position overcoming the spring 51 and, in its fully charged or cocked position, the control piston 52 carries the exhaust valve 66 to an unrestricted position relative to its valve seat 63.

When the exhaust valve 66 is opened, the pressure fluid in the expansible chamber 102 is exhausted through the passage 62 and the force created by the fluid pressure in the reaction chamber 103 acting on the effective area of the application piston 100, together with the compressive force of the return spring 106, moves the application piston 100 upwardly to seat the valve element 89a on the valve seat 91a to close off communication between the reaction chamber 103 and the reservoir 14. The valve seat 105 on the piston 100 is then moved from the valve element 89a to open the exhaust passage 88a and exhaust the fluid pressure from the friction device 18 through the exhaust port 74. The exhaustion of pressure fluid from the chamber 103 also serves to exhaust the pressure fluid from the chamber 95 and the force created by the fluid pressure in the reaction chamber 96 acting on the effective area of the application piston 92, together with the compressive force of the return spring 99, moves the application piston 92 upwardly to seat the valve element 89 on the valve seat 91 to close off communication between the reaction chamber 96 and the reservoir 15. The valve seat 98 on the piston 92 is then moved from the valve element 89 to open the exhaust passage 88 and exhaust the fluid pressure from the friction device 19 through the exhaust port 83.

If the operator desires to effect a braking application under normal operating conditions, a manually applied force on the push rod 111 is transmitted through the retainer and metering spring 108, 110 to the piston 100 and therefrom through the connecting rod 114 to the piston 92; therefore, said pistons 100, 92 are concertedly movable in response to the applied force downwardly against the compressive forces of the return springs 106, 99. This downward movement initially engages the reaction piston valve seat 105 with the valve element 85a closing the exhaust opening 88a therein and isolating the outlet chamber 103 from the atmosphere while also moving the relay piston valve seat 98 toward an advanced position juxtaposed with the valve element 85; however, since the travel between said relay piston valve seat 98 and said valve element 85 is predeterminately greater than that between said reaction piston valve seat 105 and said valve element 85a, said valve element 85 is not actuated by the applied force under normal operating conditions. Further downward movement of the reaction piston 100 urges the valve element 85a against the valve spring 90a to a position disengaged from the upper housing valve seat 91a to establish pressure fluid communication between the inlet and outlet ports 71, 72. The pressure fluid flows from the inlet port 71 through the inlet chamber 70, the connecting passage 68, the outlet chamber 103 and the outlet port 72 into the service line 16 to actuate the brake chamber 18 which, in turn, rotates the slack adjustor 20 to energize the wheel brake assembly associated therewith. At the same time, the fluid pressure so established in the outlet chamber 103 also flows therefrom through the housing passages 104 into the application chamber 95 and acts on the effective area of the relay piston 92 therein to create an application force which moves said relay piston from the advanced position thereof to engage the valve seat 98 with the valve element 85 thereby closing the valve element exhaust opening 88 and isolating the outlet chamber 96 from the atmosphere. Further downward movement of the relay piston 92 moves the valve element 85 against the valve spring 90 to a position disengaged from the lower housing valve seat 91 and establishes pressure fluid communication between the inlet and outlet ports 79, 80. In this manner, pressure fluid also flows from the inlet port 79 through the inlet chamber 77, the connecting passage 78, the outlet chamber 96 and the outlet port 80 into the service line 17 to actuate the brake chamber 19 which, in turn, rotates the slack adjustor 21 to energize the wheel brake assembly associated therewith. Of course, when the relay piston 92 is moved in response to fluid pressure in the application chamber 95, the applied force transmission of the connecting rod 114 is interrupted.

When the reaction force created by the established fluid pressure in the outlet chamber 103 acting on the effective area of the reaction piston 100 equals the manually applied force, said reaction piston is moved upwardly against the metering spring 110 wherein the valve element 85a is positioned in lapped engagement with the housing valve seat 91a, and the reaction piston valve seat 105 is positioned in lapped engagement with the valve element 85a. The reaction force acting through the metering spring 110, the retainer 108, and the push rod 112 against the manually applied force affords the operator a direct and accurate "feel" as to the extent of the braking effort or application. Similarly, when the reaction force created by the established fluid pressure in the outlet chamber 96 acting on the effective area of the relay piston 92 therein equals the application force, said relay piston is moved upwardly wherein the valve element 85 is positioned in lapped engagement with the lower housing valve seat 91, and the relay piston valve seat 98 is positioned in lapped engagement with the valve element 85. If greater breaking effort is desired, the manually applied force is increased which results in an increased application force, and the component parts of the control valve 6 function in the same manner, as previously mentioned, to again move said component parts to their lapped positions.

When the desired braking effort is attained, the manually applied force is removed from the push rod 112 and the reaction piston 100, and the valve and return springs 90a, 106 move the valve element 85a and said reaction piston upwardly toward their original positions while the compressive force of the metering spring 110 also serves to return the retainer 108 and the push rod 112 toward their original positions. Initially, this upward movement sealably re-engages the valve element 85a with the upper housing valve seat 91a to interrupt pressure fluid communication between the inlet and outlet ports 71, 72, and further upward movement of the reaction piston 100 disengages the valve seat 105 thereof from said valve element to re-establish communication between the outlet port 72 and the atmosphere and de-energize the wheel brake assemblies associated therewith by exhausting fluid pressure from the brake chamber 18 through the conduit 16, said outlet port, the outlet chamber 103, the valve element exhaust opening 88a, and the connecting plate recess 73 to the exhaust port 74. At the same time, the fluid pressure is also exhausted from the application chamber 95 through the housing passages 104 with the outlet chamber 103 and therefrom to atmosphere, as previously described. Upon the elimination of the application force, the compressive forces of the valve and return springs 90, 99 move the valve element and relay pistons 85, 92 upwardly toward their original positions. Initially, this upward movement sealably re-engages the valve element 85 with the lower housing valve seat 91 to interrupt pressure fluid communication between the inlet and outlet ports 79, 80, and further upward movement of the relay piston 92 disengages the valve seat 98 thereof from said valve element to re-establish pressure fluid communication between said outlet port and the atmosphere and de-energize the wheel brake assembly associated therewith by exhausting fluid pressure from the brake chamber 19 through the conduit 17, said outlet port, the outlet chamber 96, and the valve element exhaust opening 88 to the exhaust port 83.

Under emergency conditions when the fluid pressure in the main reservoir 3 is reduced or lost due to a malfunctioning compressor and/or leaks or the like in the system 1 ahead of the control valve 6, the fluid pressure in the inlet 36 and the passage 39 is correspondingly reduced, and when the fluid pressure acting on the area 55 of the piston 52 falls below a predetermined value, the compressive force of the spring 51 overcomes the force of the pressure fluid acting on the area 55 of the piston 52, thereby moving the piston leftwardly to close exhaust control valve 66 and opening the emergency inlet control valve 65. This action allows air flow from the emergency reservoir 8 through the control chamber 38, passages 58, internal chamber 57, axial passage 59 and passage 61 into the expansible chamber 102 to actuate the reaction and relay pistons 100, 92, as previously described. In order to de-activate the control valve 6 from its emergency condition, the fluid pressure must be re-established in the inlet 36 and the valve parts again moved to the charged or cocked positions by another charging operation.

It should be understood that if a fluid pressure failure should occur in the fluid pressure branch connected to the outlet port 72, it will result in the loss of fluid pressure in the outlet chamber 103 and the application chamber 95 and the downward movement of the application piston 100 will move the connecting rod 114 to mechanically actuate the application piston 92 and establish pressure fluid communication between the inlet and outlet ports 79, 80 to actuate the brake chamber 19, as described hereinbefore.

The embodiments of the invention in which an exclusive property or privilege is claimed are defined as follows:

1. A control valve for use in a fluid pressure system having a pair of protected fluid pressure sources connected in only pressure fluid flow receiving relation with a main source comprising a housing having a pressure fluid flow passage therethrough for connection with one of said protected sources, application means movable in said housing for controlling said flow passage, said application means defining with said housing an expansible fluid pressure chamber for selective connection with the other of said protected sources, passage means in said housing subjected to the atmosphere and normally connected in communication with said chamber, force applying means movable in said housing and extending into said chamber in driving engagement with said application means, said force applying means being movable in response to an applied force when said chamber is subjected to the atmosphere to drive said application means toward an applied position in said flow passage and establish pressure fluid flow therethrough, other means for subjection to said main source and movable in said housing to control communication between said chamber and said passage means, and said other means defining with said housing other passage means for connection with said other protected source and for selective connection in communication with said chamber, said other means being movable in response to fluid pressure at said main source less than a predetermined value toward a position interrupting communication between said chamber and said first named passage and selectively connecting said chamber in communication with said other passage means, an area on said force applying means for subjection to fluid pressure in said chamber, said area being responsive to fluid pressure acting thereon to establish a force opposing the applied force actuation of said force applying means when said chamber is selectively connected in communication with said other passage means, and said application means being automatically movable toward its applied position independently of said force applying means in response to the fluid pressure of said other protected source acting thereon when said chamber is selectively connected in communication with said other passage means.

2. A control valve for use in a fluid pressure system having a pair of protected fluid pressure sources connected in only pressure fluid flow receiving relation with a main fluid pressure source comprising a housing having a pressure fluid flow passage therethrough for connection with one of said protected sources, application means movable in said housing for controlling said flow passage, said application means defining with said housing an expansible fluid pressure chamber normally subjected to the atmosphere and adapted for selective subjection to the fluid pressure at the other of said protected sources, force applying means movable in said housing and extending into said chamber including an end portion exteriorly of said housing for receiving an applied force, and an opposed end portion within said chamber in driving engagement with said application means, said force applying means being movable in response to an applied force on the exterior end portion thereof to concertedly drive said application means toward an applied position in said flow passage establishing pressure fluid flow therethrough when said chamber is subjected to the atmosphere, passage means in said housing for subjection to the atmosphere and normally connected in communication with said chamber, other means for subjection to the fluid pressure at said main source movable in said housing including means defining with said housing other passage means for connection with said other protected source and for selective connection in communication with said chamber, and valve means movable in said other means for controlling communication between said chamber and said first named and other passage means, said other means being movable in response to fluid pressure at said main source less than a predetermined value to move said valve means to a position interrupting communication between said chamber and said first named passage means and establishing communication between said chamber and said other passage means, and an area on said interior end portion for subjection to fluid pressure in said chamber, said area being responsive to fluid pressure in said chamber to create a force in opposition to the applied force and opposing the applied force actuation of said force applying means upon the actuation of said valve means to establish communication between said chamber and other passage means subjecting said chamber to the fluid pressure of said other protected source, and said application means being automatically movable toward its applied position independently of the force applying means in response to the fluid pressure of said other protected source acting thereon upon the actuation of said valve means to establish communication between said chamber and said other passage means subjecting said chamber to the fluid pressure of said other protected source.

References Cited

UNITED STATES PATENTS

| | | | |
|---|---|---|---|
| 2,623,543 | 12/1952 | Heinisch | 251—14 X |
| 3,183,042 | 5/1965 | Bueler | 303—52 |
| 3,212,825 | 10/1965 | Bueler | 303—40 X |

ARNOLD ROSENTHAL, *Primary Examiner.*

U.S. Cl. X.R.

137—495, 596.15, 627.5; 251—14; 303—40, 52